(12) United States Patent
Nguyen et al.

(10) Patent No.: US 10,498,007 B2
(45) Date of Patent: Dec. 3, 2019

(54) LOOP ANTENNA FOR DOWNHOLE RESISTIVITY LOGGING TOOL

(71) Applicant: HALLIBURTON ENERGY SERVICES, INC., Houston, TX (US)

(72) Inventors: Minh Dang Nguyen, Singapore (SG); Lay Wei Ang, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 173 days.

(21) Appl. No.: 15/853,043

(22) Filed: Dec. 22, 2017

(65) Prior Publication Data

US 2019/0198966 A1 Jun. 27, 2019

(51) Int. Cl.
| | |
|---|---|
| *H01Q 1/04* | (2006.01) |
| *H01Q 1/42* | (2006.01) |
| *H01Q 7/08* | (2006.01) |
| *E21B 47/12* | (2012.01) |

(52) U.S. Cl.
CPC ............. *H01Q 1/04* (2013.01); *H01Q 1/42* (2013.01); *H01Q 7/08* (2013.01); *E21B 47/122* (2013.01)

(58) Field of Classification Search
CPC .............. H01Q 1/04; H01Q 1/42; H01Q 7/08
USPC ........................................................ 343/719
See application file for complete search history.

(56) References Cited

U.S. PATENT DOCUMENTS

| | | | |
|---|---|---|---|
| 7,839,346 B2 * | 11/2010 | Bittar .................. | H01Q 1/04 343/719 |
| 2017/0191364 A1 * | 7/2017 | Wang .................. | G01V 3/28 |

* cited by examiner

*Primary Examiner* — Andrea Lindgren Baltzell (57) ABSTRACT

A loop antenna assembly is provided that can include a loop antenna with one of more magnet wires encased in a non-magnetic flexible sheath and mounted to a transceiver block that is mountable to a tool body, where the loop antenna can at least partially encircle the tool body. The loop antenna can include a plurality of magnet wires each individually encased in the sheath, with a metal adaptor attached to each end. The magnet wire can be coated with thin insulation, thin enamel insulation, and/or a polymer film. A plane of the loop antenna can be perpendicular relative to the longitudinal axis or at an obtuse angle relative to the longitudinal axis. A non-magnetic locating ring positioned in the loop antenna assembly can secure the loop antenna of the assembly about the tool body.

20 Claims, 11 Drawing Sheets

LOOP ANTENNA FOR DOWNHOLE RESISTIVITY LOGGING TOOL

TECHNICAL FIELD

The present disclosure generally relates to oilfield equipment and, in particular, to downhole tools, drilling and related systems and techniques for using loop antennas in downhole applications. More specifically, techniques for using a cable with multiple conductors embedded in a flexible non-magnetic material to build a loop antenna.

BACKGROUND

In order to produce formation fluids from an earthen formation, wellbores can be drilled into the earthen formation to a desired depth for producing the formation fluids. During and/or after drilling a wellbore, various antennas can be deployed into the wellbore in a drill string assembly and/or a wireline logging tool to measure various wellbore parameters (e.g. formation resistivity, formation permeability, ranging distance and direction, tubing string integrity, cement sheath integrity, etc.). Loop antennas can be used as transmitters to inject energy (e.g. electrical, electromechanical, magnetic flux, etc.) into an earthen formation surrounding a wellbore. Loop antennas can also be used as receivers to receive energy from the earthen formation. Both the transmission and reception of energy by the antennas can be directly impacted by the antennas antenna design. Traditionally, loop antennas are formed of a standard wire conductor encased in a comparatively thick layer of thermoplastic or thermoset insulation and disposed within metal tubing shaped into a loop that encircles a tool body. The metal tubing provides rigidity to the insulated wire conductor and protects it from the downhole environment. Because the tubing is metal, in order for a signal to be transmitted or received from the wire without interference from the metal tubing, a gap or junction is formed in the metal tubing, which junction is covered by a dielectric material through which a signal can pass. One drawback to such an arrangement is that the metal tubing inhibits not only the strength of an electromagnetic signal, but also the direction the signal can travel.

Therefore, it will be readily appreciated that improvements in the arts of retaining ferrite beads to shield and/or direct signals to/from antennas are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Generally, a loop antenna assembly for an electromagnetic resistivity logging tool is provided. The loop antenna assembly is mounted on a tool body and configured to transmit and/or receive electromagnetic (EM) waves. The loop antenna assembly includes a loop antenna formed of one or more magnet wires, where each magnet wire is a coated, solid conductor encased in a non-magnetic sheath. Each magnet wire and non-magnetic sheath extends uninterrupted between a first free end and a second free end of the loop antenna. Each of the free ends of the conductor and sheath are secured to a transceiver block which is mountable to the tool body so that the conductors and sheath encircle the tool body.

Figure 1:
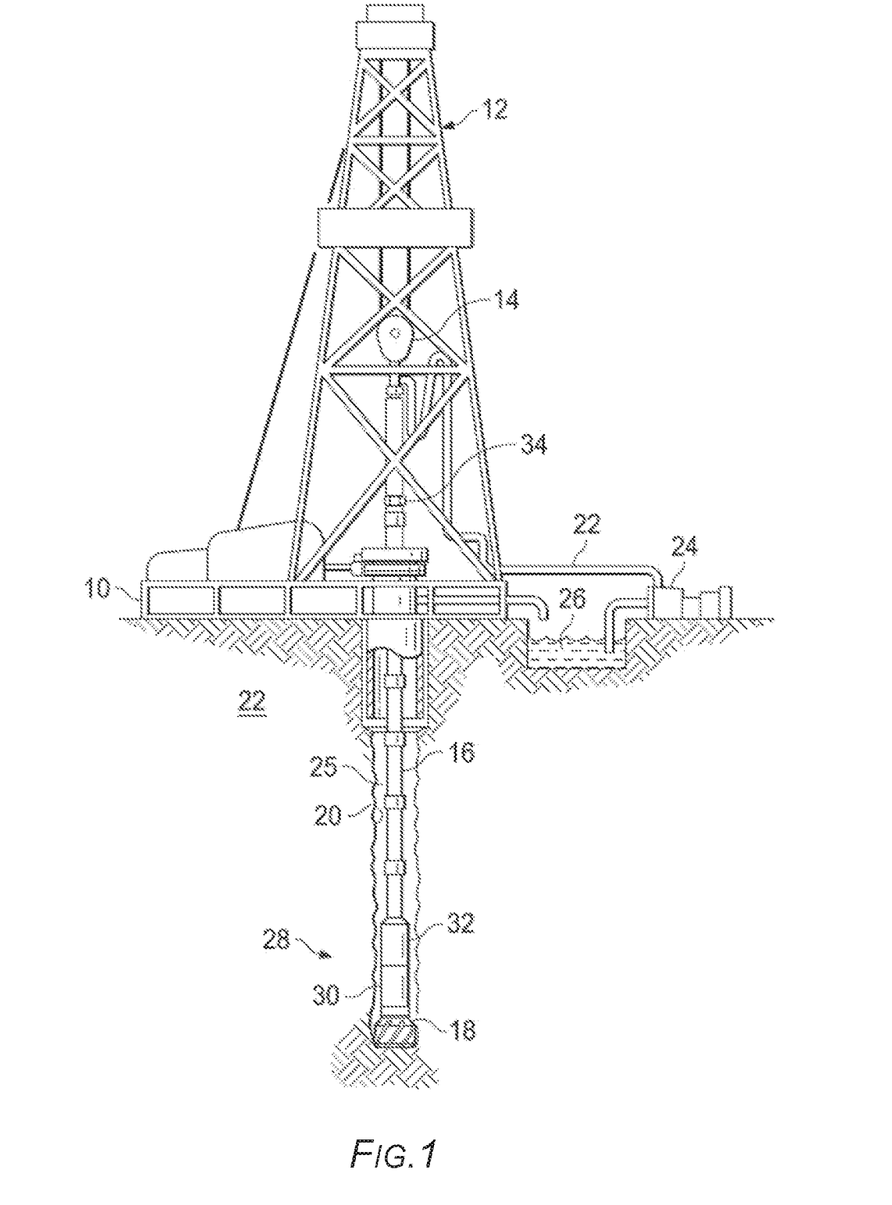
FIG. 1 is a representative partial cross-sectional view of a system for capturing subsurface measurement data in a logging while drilling (LWD) operation with an antenna, according to one or more embodiments.

The disclosed tool configurations and operations are best understood in the context of the larger systems in which they operate. Accordingly, an illustrative measurement while drilling (MWD) and/or logging while drilling (LWD) environment is shown in FIG. 1. A drilling platform 10 supports a derrick 12 having a traveling block 14 for raising and lowering pipe strings such as drill string 16. A drill bit 18 carried on drill string 16 may be driven by a downhole motor and/or rotation of the drill string 16. As drill bit 18 rotates, it creates a borehole 20 in formation 22. A pump 24 circulates drilling fluid downhole through the interior of drill string 16, through orifices in drill bit 18, back to the surface via the annulus 25 formed between borehole 20 and drill string 16, and into a retention tank 26. The drilling fluid transports cuttings from the borehole 20 into the tank 26 and aids in maintaining the borehole integrity.

An electromagnetic resistivity logging tool 30 can be carried by drill string 16. In some embodiments, resistivity tool 30 is integrated into the bottom-hole assembly 28, near drill bit 18. As the drill bit 18 extends the borehole 20 through the formation 22, resistivity logging tool 30 may be activated to collect measurements relating to various formation properties, as well as the tool orientation and position and various other drilling conditions. The resistivity logging tool 30 may take the form of a drill collar, i.e., a thick-walled tubular that provides weight and rigidity to aid the drilling process. A telemetry sub 32 may be included to transfer tool measurements to a surface receiver 34 and to receive commands from the surface receiver.

Figure 2:
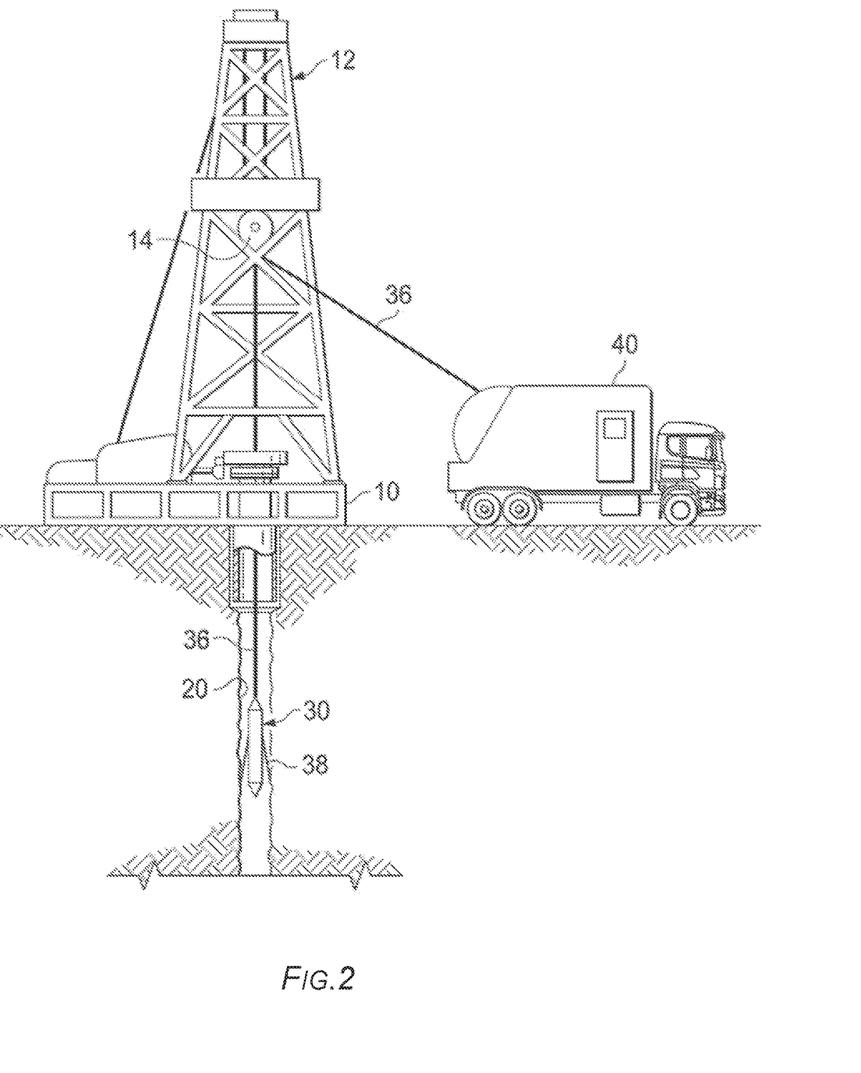
FIG. 2 is a representative partial cross-sectional view of a system for capturing subsurface measurement data in a wireline logging operation with an antenna, according to one or more embodiments.

As shown in FIG. 2, rather than deploying resistivity logging tool 30 on a drill string for use in LWD and/or MWD operations, resistivity logging tool 30 may be deployed into borehole 20 on another conveyance mechanism 36, such as a wireline, slickline, cable, coiled tubing or other tubing string. Thus, in FIG. 2, a cable 36 is utilized to lower resistivity logging tool 30 into borehole 20. Cable 36 may include conductors for transporting power to resistivity logging tool 30 and telemetry from resistivity logging tool 30 to the surface. Resistivity logging tool 30 may have centralizing arms 38 that center the tool 30 within the borehole 20 as the tool is pulled uphole. A logging facility 40 collects measurements from resistivity logging tool 30, and may include computing facilities for processing and storing the measurements gathered by the logging tool 30.

Figure 3:
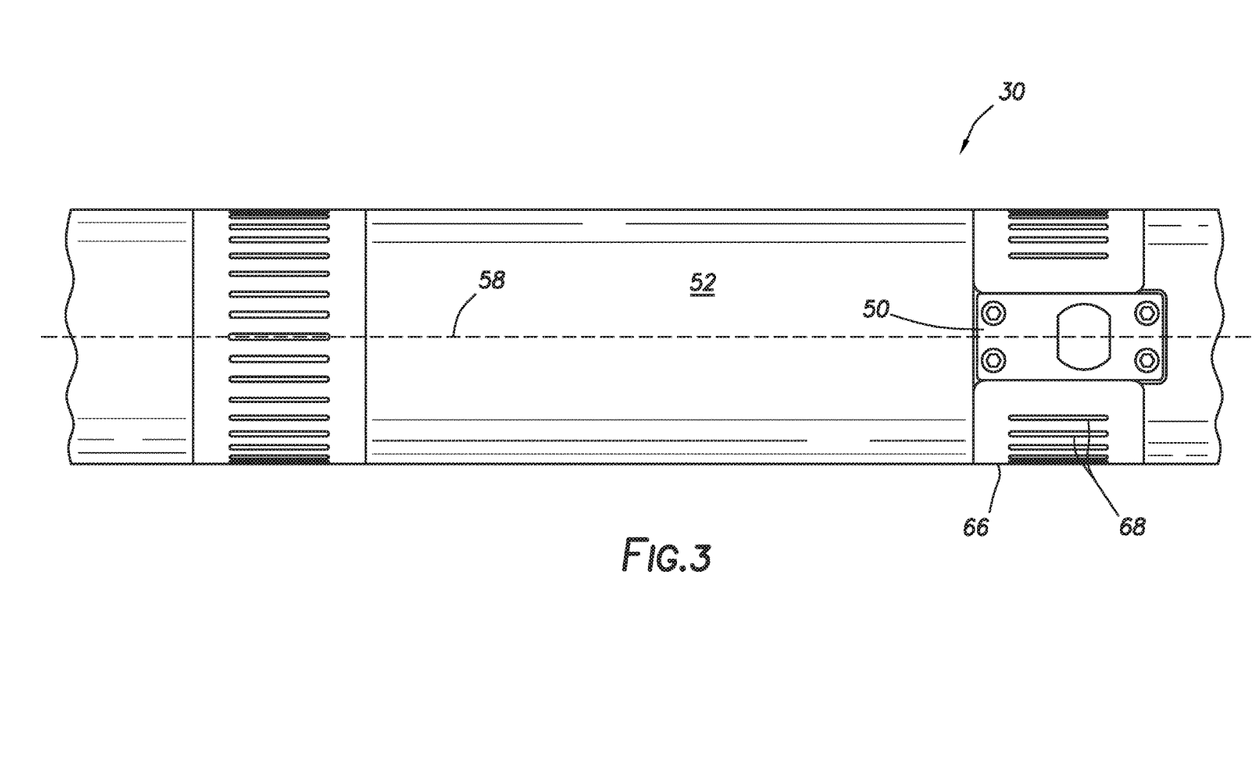
FIG. 3 is side view of a downhole tool that can benefit from the principles of this disclosure, according to one or more embodiments.

FIG. 3 shows a representative side view of an example downhole tool 30 in the form of a drill collar. The tool 30 can be interconnected in a drill string 18 by connecting the ends of the drill collar to adjacent segments of drill pipe or other downhole tools. The tool 30 can include a central axis 58, a body 52, and an interior flow passage 54 that extends through the tool 30. An antenna assembly 50 can be disposed on an exterior of the body 52. The antenna assembly 50 can be a coil-type antenna (or otherwise referred to as a loop antenna assembly), where a conductor forms loops around a body 52 of the tool 30. The loop antenna assembly 50 can be used to transmit electromagnetic signals 70 (see FIG. 4) into earthen formations 22 that surround the borehole 20. However, it should be understood that more or fewer antenna assemblies 50 can be included in the tool 30, and that the antenna assemblies 50 can be used to transmit and/or receive electromagnetic signals between earthen formations as well as other antenna assemblies 50.

Figure 4:
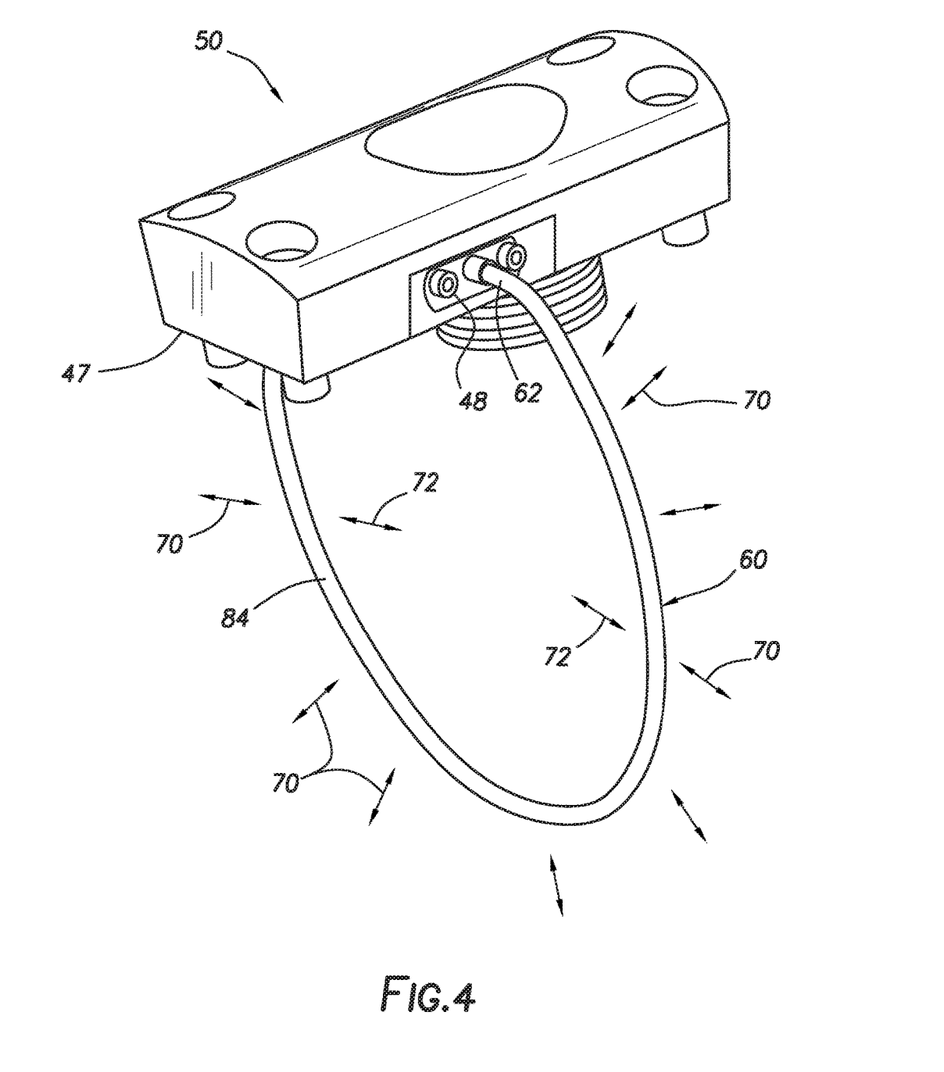
FIG. 4 is a representative perspective view of a loop antenna that can be used in a downhole tool, according to one or more embodiments.

FIG. 4 is a representative perspective view of a loop antenna assembly 50 that can be used with the downhole tool 30. The loop antenna assembly 50 includes a transceiver block 47 and a loop antenna 60, with a metal adaptor 48 at each free end 62 of the loop antenna 60 to attach the free ends 62 of the loop antenna 60 to the transceiver block 47. As shown, the loop antenna 60 extends uninterrupted between the free ends 62. In one or more embodiments, the loop antenna 60 is formed of a solid conductor 80 (see FIG. 8A) embedded in a non-magnetic sheath 84. In one or more embodiments, conductor 80 (see FIG. 8A) is a magnet wire, which conductor is coated with a thin layer of insulation or film 82 (see FIG. 8A), as opposed to being coated with thicker thermoplastic or thermoset insulation. The transceiver block can include antenna transceivers that drive signals to the loop antenna 60 and receive signals from the loop antenna 60. The loop antenna 60 can receive and transmit electromagnetic signals 70, 72, that can be transmitted into the earthen formation 22, as well as received from the formation 22 (and/or other antenna assemblies 50). A benefit of the principles of the current disclosure is that the loop antenna assembly 50 can transmit and receive EM signals along the length of the loop antenna 60, providing a nearly complete circumferential radial distribution and/or collection of the EM signals 70 around the tool body 52. This permits greater distribution of the signals into the formation 22 as well as greater visibility of the loop antenna assembly 50 for collecting EM signals from the formation 22.

Figure 5:
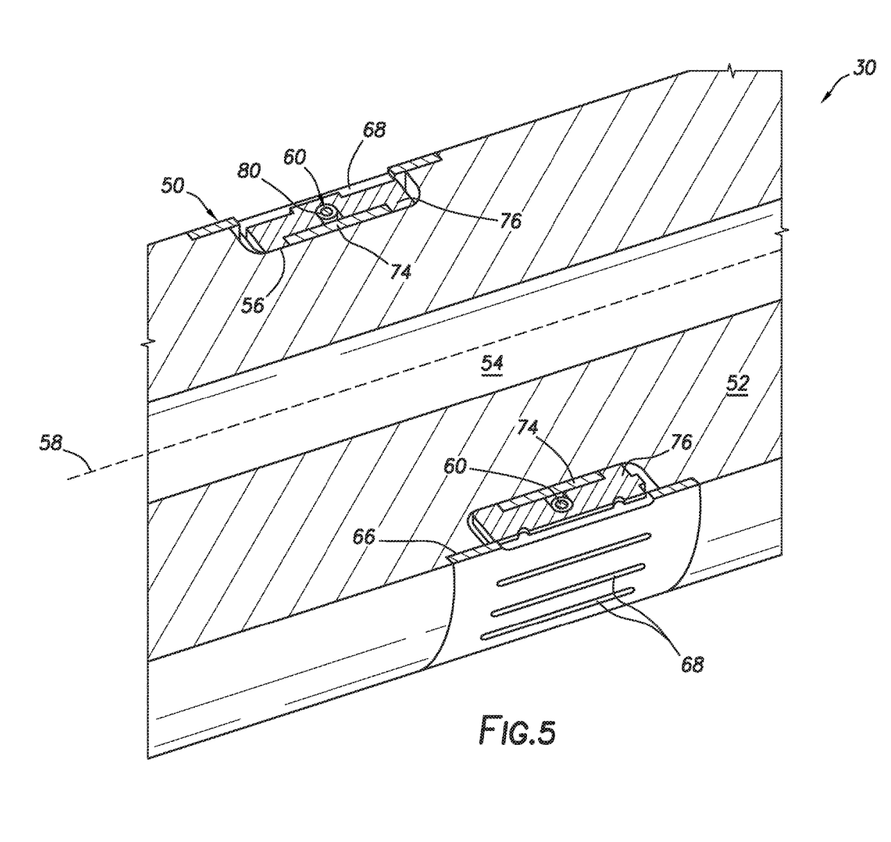
FIG. 5 is a representative perspective partial cross-sectional view of the downhole tool of FIG. 3 with a loop antenna, according to one or more embodiments.

FIG. 5 is a representative partial cross-sectional view of the loop antenna 60, which can be installed in a recess 56 in an exterior surface of the tool body 52 and encircles the tool body 52. In one or more embodiments, loop antenna 60 can be secured in recess 56 by a locating ring 76. The locating ring 76 can include a non-magnetic material that is transparent to EM signals (e.g. signals 70, 72). A ferrite ring 74 may be positioned radially between the loop antenna 60 and the body 52 to minimize EM signals 72 that would otherwise enter the body 52. A shield 66 can be positioned radially outward from the locating ring 76 and can provide protection to the loop antenna 60 as the tool 30 is being deployed in the borehole 20. The shield 66 can include slots 68 to allow transmission of the electromagnetic signals 70 through the shield 66, especially if the shield 66 is made from a material with a low permeability to magnetic flux (e.g. steel, aluminum, etc.). However, the shield 66 can be made from a material with a high permeability to magnetic flux (e.g. non-magnetic material, composites, etc.), in which case the slots 68 may not be needed. It should be understood that some embodiments may not use a shield, depending upon the design of the loop antenna assembly 50 and how it is mounted to the tool 30. FIG. 5 also illustrates loop antenna 60 with a single conductor 80.

Figure 6:
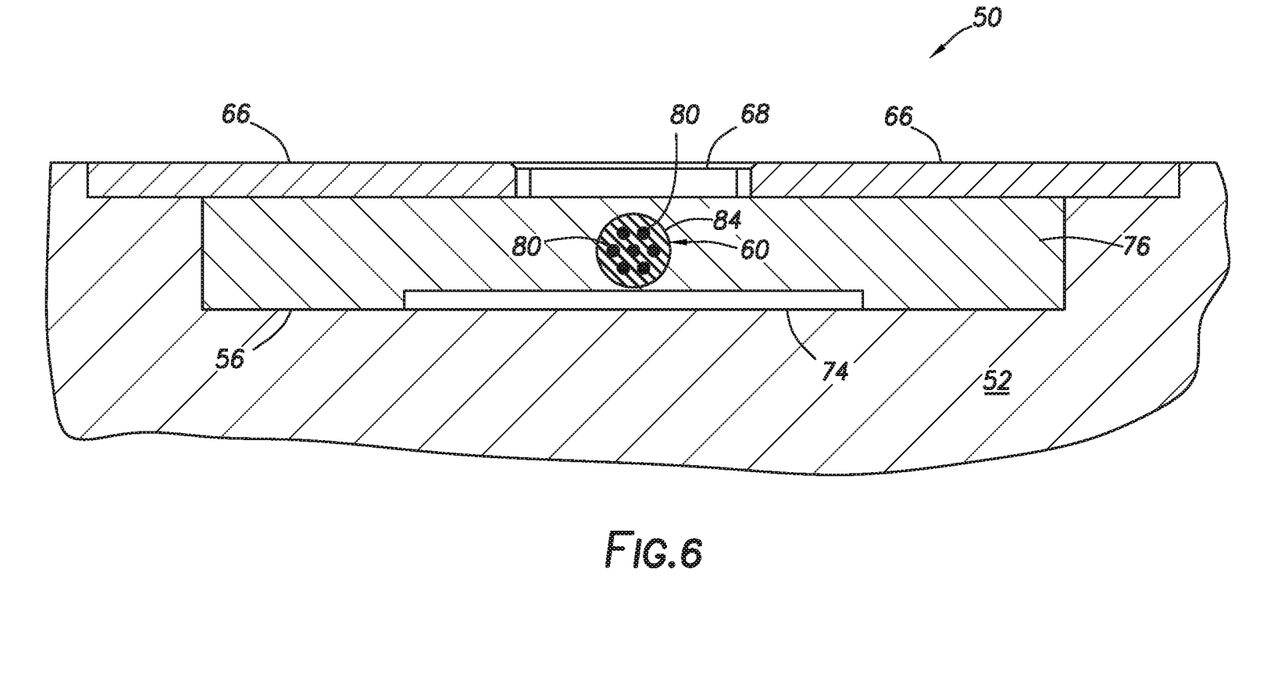
FIG. 6 is a representative partial cross-sectional view of a portion of the loop antenna of the downhole tool of FIG. 3, according to one or more embodiments.

FIG. 6 is a more detailed representative partial cross-sectional view of a portion of the loop antenna assembly 50, namely loop antenna 60 is shown installed in recess 56 in an exterior surface of the body 52. FIG. 6 is similar to a portion of FIG. 5, except that the cross-section of the loop antenna 60 shows multiple conductors 80 embedded in a non-magnetic sheath 84.

Figure 7:
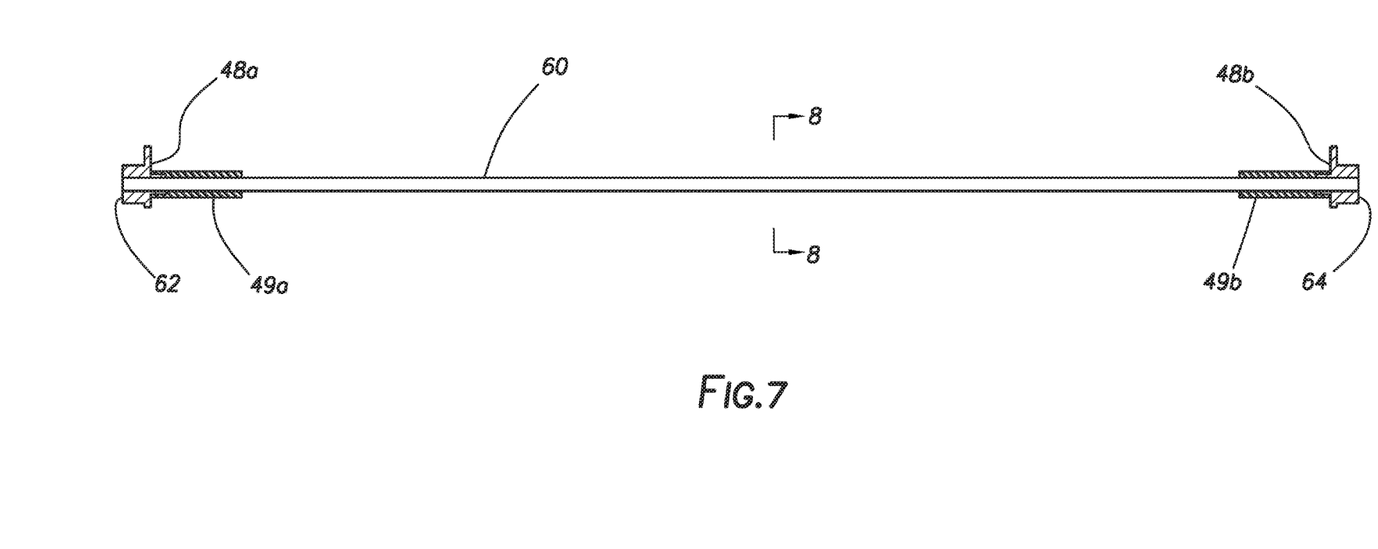
FIG. 7 is a representative partial cross-sectional view of a loop antenna before the antenna is bent into a loop, according to one or more embodiments.

FIG. 7 shows a portion of loop antenna assembly 50 before the flexible loop antenna 60 is bent into a circular shape. The loop antenna assembly 50, as shown, has an adaptor 48a at a first free end 62 of loop antenna 60 and an adaptor 48b at a second free end 64 of loop antenna 60. In this example, the metal adaptors 48a, 48b are used to secure the free ends 62, 64, to the transceiver block 47. An overmolding 49a can be provided over a portion of the loop antenna 60 and a portion of the metal adaptor 48a to distribute bending stresses on the loop antenna 60 at the metal adaptor 48a. Likewise, an overmolding 49b can be provided over a portion of the loop antenna 60 and a portion of the metal adaptor 48b to distribute bending stresses on the loop antenna 60 at the metal adaptor 48b. The overmolding may be formed of a flexible, elastomeric material.

Figure 8A:
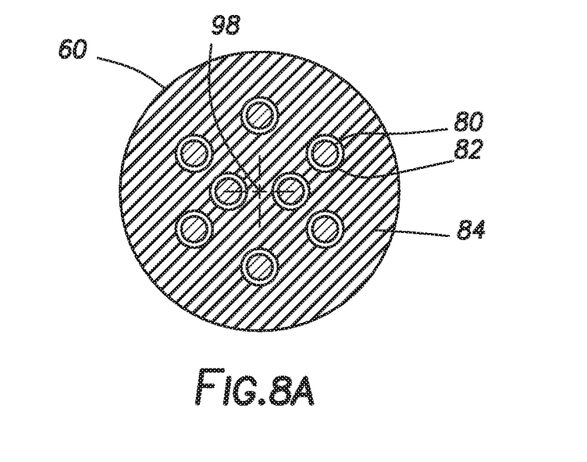
FIGS. 8A-8C are a representative cross-sectional views of conductor arrangements of the loop antenna of FIG. 7, according to one or more embodiments.
Figure 8B:
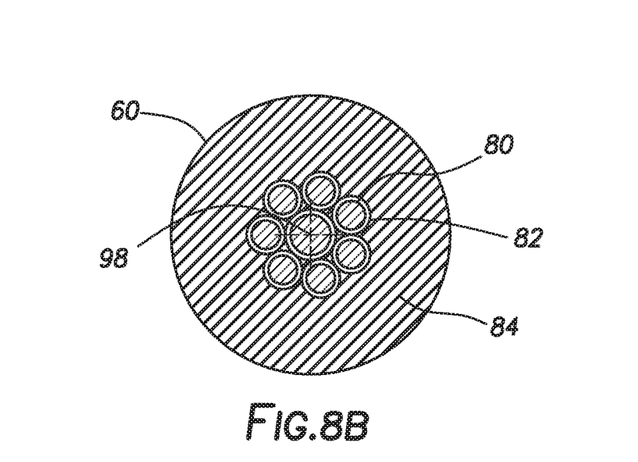
Figure 8C:
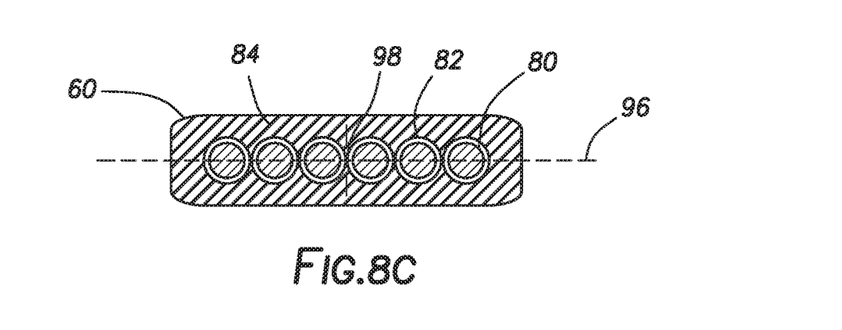

FIGS. 8A-8C show representative cross-sectional views of some examples of the loop antenna 60. Generally, in one or more embodiments, loop antenna 60 can include multiple conductors 80 embedded or encased in a non-magnetic sheath 84. The conducts 80 may be magnet wires, in which case they may have an exterior coating or film 82 to protect and insulate the conductors 80. The coating 82 can prevent shorting between adjacent magnet wires 80 embedded together in the sheath 84. The coating can be any material that can be applied to the exterior of conductor 80 and prevent shorting between adjacent conductors 80 (e.g. a thin insulation, a thin enamel insulation, and/or a polymer film). FIG. 8A shows a somewhat random distribution of the plurality of the separate conductors 80 about the central axis 98 of the non-magnetic sheath 84. The cross-section of the loop antenna 60 is substantially circular about the central axis. This configuration may allow cost reductions associated with manufacturing of the loop antenna 60, since the arrangement of the magnet wires may allow relaxed manufacturing tolerances. FIG. 8B shows an ordered arrangement of the magnet wires 80 about the central axis 98 with the plurality of the separate conductors 80 disposed (or arranged) symmetrically about the central axis 98 of the non-magnetic sheath 84. The cross-section of the loop antenna 60 is substantially circular about the central axis. It may be preferred for the grouping of the conductors 80 to be generally centered about the central axis, but it is not a requirement that it should be so. The group can move back and forth in the sheath 84 as the loop antenna 60 is being built. However, the conductors 80 should not be positioned so close to the exterior of the sheath 84 that the sheath cannot adequately protect the strands during use of the loop antenna assembly 50.

FIG. 8C shows an ordered arrangement of the conductors 80 with the plurality of the strands of the conductors 80 disposed (or arranged) symmetrically about the central axis 98 of the non-magnetic sheath 84. The cross-section of the loop antenna 60 is a substantially flattened or planar shape formed along a central plane 96, such as a rectangular or flattened oval shape. In this regard, the conductors 80 may be disposed in substantially the same plane 96 within the sheath 84. It should be understood that more or fewer conductors 80 may be used in the configurations of the loop antenna 60 shown in FIGS. 8A-8C. For example, more conductors 80 can be added to or taken away from the number of conductors 80 in the circularly shaped sheath of FIG. 8A. Additionally, for example, rings of conductors 80 can be added to or taken away from the number of conductors 80 in the circularly shaped sheath of FIG. 8B which shows a center magnet wire 80 with only one ring of conductors 80 surrounding the center conductor 80. Additionally, for example, additional planes of one or more conductors 80 can be added to the number of conductors 80 in the flattened shaped sheath of FIG. 8C.

Figure 9:
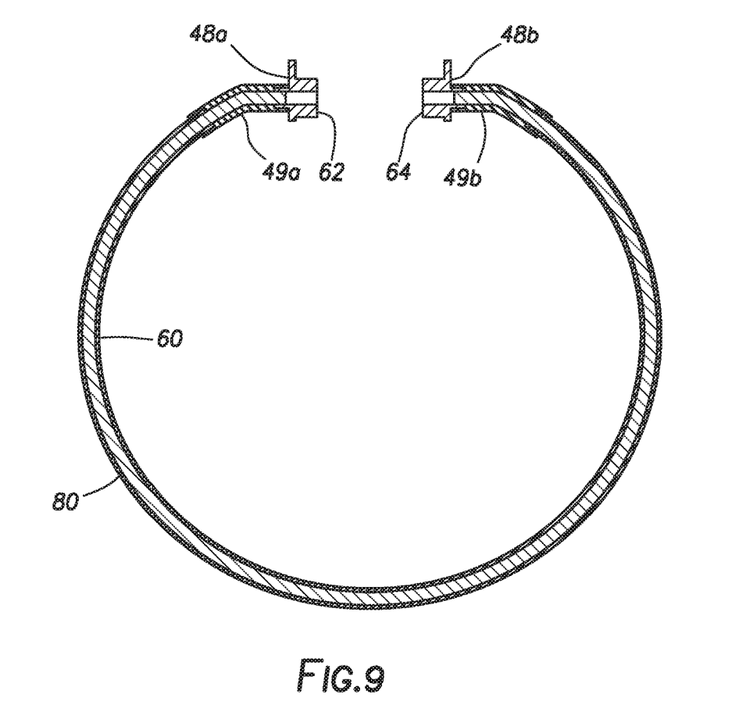
FIG. 9 is a representative partial cross-sectional view of the loop antenna of FIG. 7 formed into a loop, according to one or more embodiments.

FIG. 9 shows the loop antenna 60 of FIG. 7 bent into a circular shape, with one or more conductors 80 in the loop antenna 60, and metal adaptors 48a, 48b attached to the free ends 62, 64, respectively, and the overmolds 49a, 49b on a portion of the loop antenna 60 and a portion the respective metal adaptors 48a, 48b.

Figure 10:
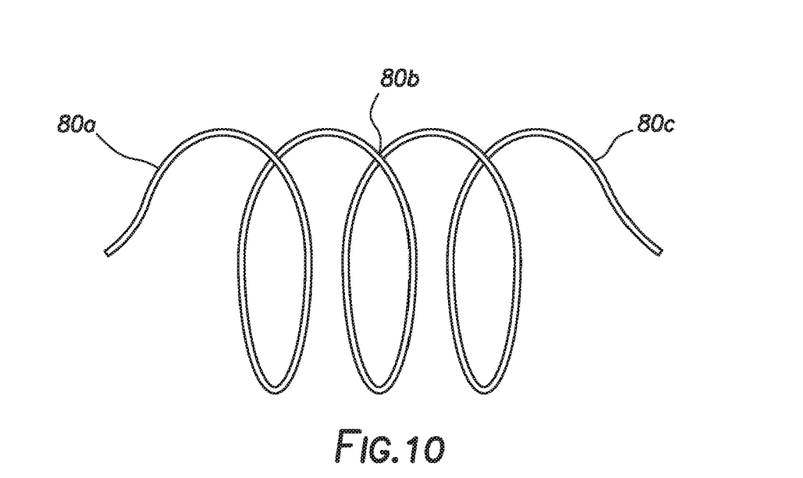
FIG. 10 is a representative diagrammatic view of an effective conductor path of loop antenna conductors after the loop antenna of FIG. 9 is assembled into a loop antenna assembly, according to one or more embodiments.

In one or more embodiments, when assembled to the transceiver 47, the multiple individual conductors 80 within a loop antenna 60 can be coupled together end-to-end to form a continuous helical conductor path for the loop antenna assembly 50 as shown graphically in FIG. 10. In other words, a first conductor 80a with a sheath 84 (not shown) can be coupled to a second conductor 80b within the sheath 84 (not shown), which second conductor 80 can then be coupled to a third conductor 80c within the sheath 84 (not shown) so as to form multiple conductor loops within the single loop antenna 60. It will be appreciated that such a helical conductor path is desirable to enhance signal propagation and reception.

Figure 11:
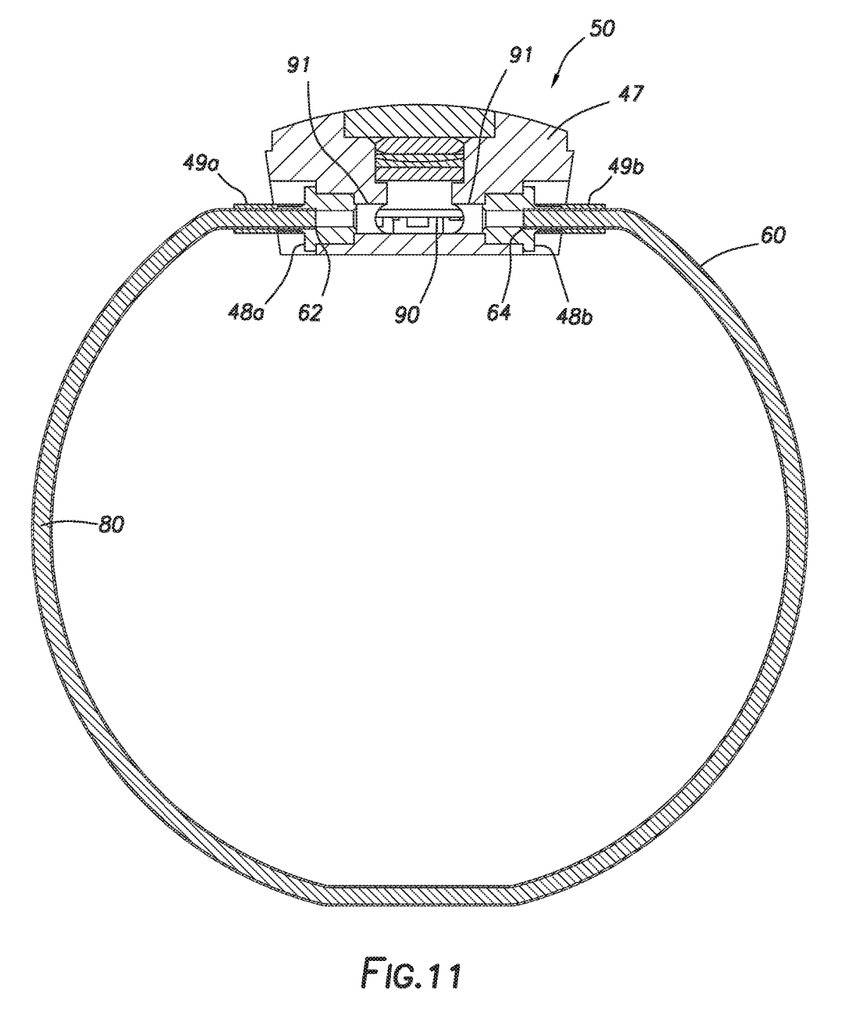
FIG. 11 is a partial cross-sectional view of a loop antenna assembly that can use the loop antenna of FIGS. 7 to 9, according to one or more embodiments.

FIG. 11 shows a representative cross-sectional side view of the loop antenna assembly 50, which includes a printed circuit board ("PCB") 90 disposed within the transceiver block 47. The completed loop antenna assembly 50 is shown without the downhole tool 30 components for clarity. The loop antenna 60 (examples shown in FIGS. 7 and 9) is coupled to the transceiver block 47 by the metal adaptors 48a, 48b. A printed circuit board 90 is disposed within the transceiver block 47 and positioned between the free ends 62, 64 of the loop antenna 60. Connections 91 can be used to connect the free ends 62, 64 of each of the conductors 80 embedded in the sheath 84 to form the helical conductor path shown in FIG. 10. The PCB 90 can couple the free end 64 of one conductor 80 to the free end 62 of another conductor 80, and repeat this process until the desired number of conductors 80 within a sheath 84 (see FIG. 8A) are connected together in a helical conductor path, such as shown in FIG. 10. The foregoing also simplifies manufacture of the loop antenna assembly 50 since a helical conductor path can be readily formed simply by attaching each of the free ends of the individual conductors to one another at or through the PCB 90 using a single loop antenna 60 having multiple conductors 80 embedded therein.

Figure 12:
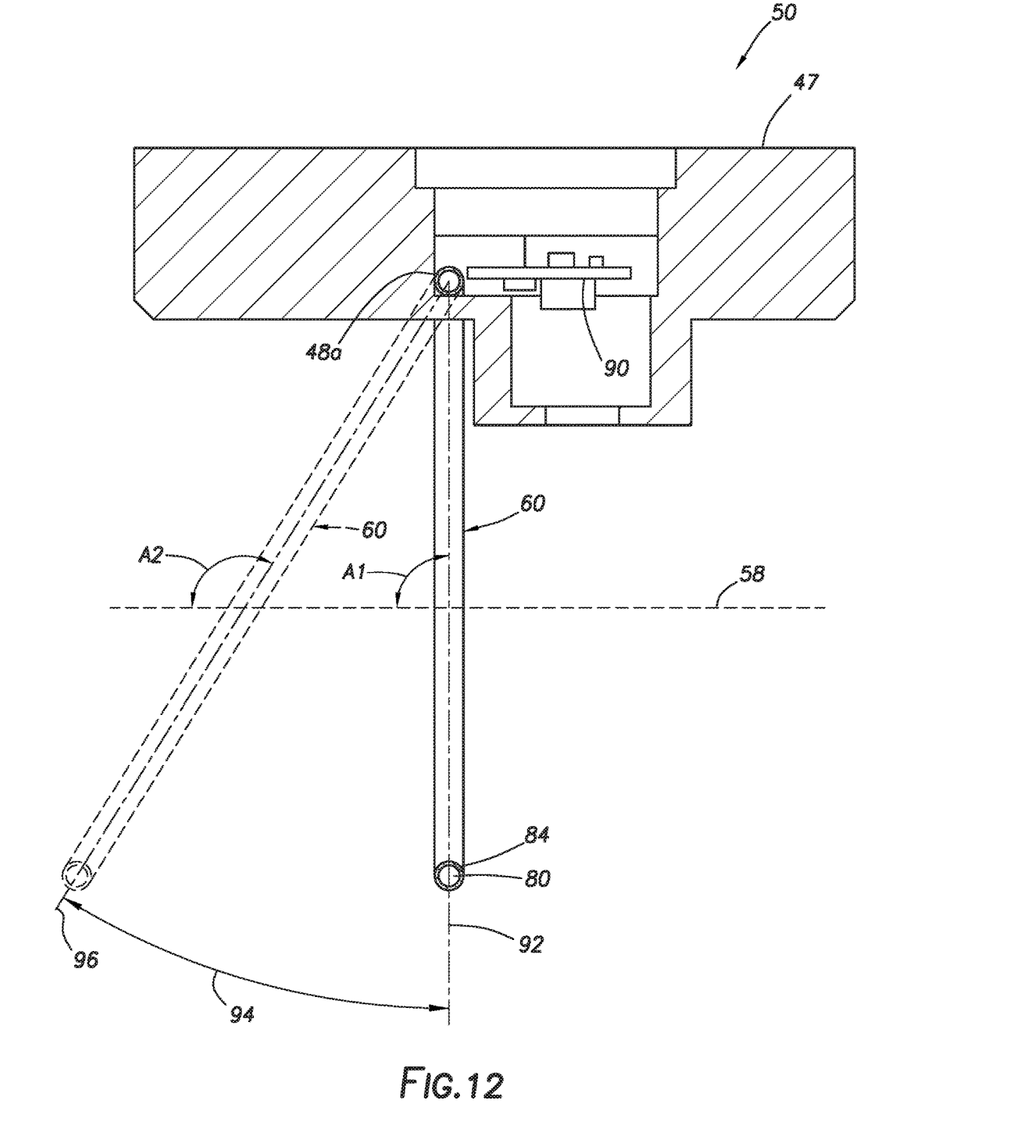
FIG. 12 is a partial cross-section view of the loop antenna assembly of FIG. 11, viewed from a plane that is orthogonal to the view of FIG. 11.

The completed loop antenna assembly 50 can form a circularly shaped loop antenna 60 as shown in FIG. 11. As shown in FIG. 12, the loop antenna 60 may be positioned in a plane 92 that is perpendicular (see angle A1) to the central axis 58 of the tool 30. However, the loop antenna 60 may be positioned in a plane 96 which can be at a non-orthogonal angle to the central axis 58 of the tool 30. By forming the loop antenna 60 at various angles relative to the central axis 58, the transmission and reception of EM signals can be directed at different angles to/from the loop antenna assembly 50. It should be understood that the loop antenna 60 may become oblong or oval (i.e. not circular) when the loop antenna 60 is positioned at other angles that being perpendicular. FIG. 12 shows a circular version of the loop antenna 60 positioned at an obtuse angle A2. At angles other than perpendicular, the loop antenna 60 may be elongated as shown to accommodate the obtuse angled plane 96 configurations. It should be understood that the plane 92, 96 of the loop antenna 60 can be at various angles to the central axis 58, such as 90 degrees, 100 degrees, 110 degrees, 120 degrees, 130 degrees, 135 degrees, 140 degrees, 150 degrees, 160 degrees, 170 degrees, and 180 degrees, but not limited to these angles.

One general aspect can include an antenna assembly for a downhole resistivity logging tool having a tool body characterized by a longitudinal axis, the antenna assembly including: a loop antenna including a conductor such as a magnet wire encased in a non-magnetic sheath, the magnet wire and non-magnetic sheath extending uninterrupted between a first free end and a second free end of loop antenna; and a transceiver block mountable to the tool body, where each of the free ends of the loop antenna is secured to the transceiver block so that the loop antenna forms a loop that can at least partially encircle a tool body.

Implementations may include one or more of the following features. The antenna assembly where the loop antenna includes a plurality of single, solid, conductors individually encased in the sheath. The antenna assembly can include a metal adaptor attached to each free end of the loop antenna, each metal adaptor securing a free end of the loop antenna to the transceiver block with an overmolding disposed on a portion of the metal adaptor and a portion of the loop antenna. The conductor may be magnet wire, and thus coated with thin insulation, thin enamel insulation, and/or a polymer film. The tool can further include a metal adaptor attached to each free end of the loop antenna and securing the loop antenna to the transceiver block. A plane of the loop antenna can be perpendicular relative to the longitudinal axis or at an obtuse angle relative to the longitudinal axis.

The tool can include an elastomer sheath overmolding a portion of the metal adaptor and a portion of the loop antenna. The tool can include a plurality of strands of magnet wire encased in the sheath. The tool can include a substantially circular cross-section, with the plurality of strands disposed symmetrically about an axis of the sheath. The sheath can be is formed along a plane so as to have a flattened cross-section and each of the plurality of strands can be disposed in substantially the same plane of the sheath. The loop antenna is flexible between the first and second free ends. The loop antenna can include a plurality of strands of magnet wire encased in the sheath with each of the strands of magnet wire having a first free end and a second free end. The first free end of one strand of magnet wire can be electrically connected to the second free end of another strand of magnet wire at the transceiver block. The loop antenna can include a plurality of single, solid, conductive strand of magnet wire individually encased in the sheath. The loop antenna can include a metal adaptor attached to each free end of the loop antenna, each metal adaptor securing a free end of the loop antenna to the transceiver block with an elastomer sheath overmolding a portion of the metal adaptor and a portion of the loop antenna.

One general aspect can include a downhole resistivity logging tool including: a downhole tool body having a longitudinal axis; a loop antenna including a magnet wire encased in a flexible, non-magnetic sheath, the magnet wire and sheath extending between a first free end and a second free end of the loop antenna; and a transceiver block mounted on the tool body, where each of the first and second free ends of the loop antenna is secured to the transceiver block so that the loop antenna at least partially encircles the tool body.

Implementations may include one or more of the following features. The magnet wire can be coated with thin insulation, thin enamel insulation, and/or a polymer film. The tool can further include a metal adaptor attached to each free end of the loop antenna and securing the loop antenna to the transceiver block. A plane of the loop antenna can be perpendicular relative to the longitudinal axis or at an obtuse angle relative to the longitudinal axis. The tool can include an elastomer sheath overmolding a portion of the metal adaptor and a portion of the loop antenna. The tool where the loop antenna includes a plurality of strands of magnet wire encased in the sheath. The tool can include a sheath with a substantially circular cross-section, where the strands of magnet wire are disposed symmetrically about an axis of the sheath.

The sheath can be formed along a plane so as to have a flattened cross-section and each of the plurality of strands can be disposed in substantially the same plane of the sheath. The loop antenna can be flexible between the first and second free ends. The loop antenna can include a plurality of strands of magnet wire encased in the sheath with each of the strands of magnet wire having a first free end and a second free end, and the first free end of one strand of magnet wire is electrically connected to the second free end of another strand of magnet wire at the transceiver block. The loop antenna can include a plurality of single, solid, conductive strand of magnet wire individually encased in the sheath. A metal adaptor can include attached to each free end of the loop antenna, with each metal adaptor securing a free end of the loop antenna to the transceiver block and an elastomer sheath overmolding a portion of the metal adaptor and a portion of the loop antenna.

One general aspect can include a downhole resistivity logging tool including: a downhole tool body having a longitudinal axis; a loop antenna including a magnet wire can include encased in a flexible, non-magnetic sheath with the magnet wire and sheath extending uninterrupted between a first free end and a second free end of loop antenna; a transceiver block mounted on the tool body, where each of the free ends of the loop antenna is secured to the transceiver block so that the loop antenna at least partially encircles the tool body; a shield extending adjacent the loop antenna around the tool body; and. a non-conducting locating ring positioned between the shield and the tool body, the locating ring securing the loop antenna about the tool body.

Implementations may include one or more of the following features. The loop antenna can include a plurality of single, solid, conductive strand of magnet wire individually encased in the sheath. A metal adaptor can be attached to each free end of the loop antenna, each metal adaptor securing a free end of the loop antenna to the transceiver block with an elastomer sheath overmolding a portion of the metal adaptor and a portion of the loop antenna.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. An antenna assembly for a downhole resistivity logging tool having a tool body characterized by a longitudinal axis, the antenna assembly comprising:
    a loop antenna comprising a magnet wire encased in a non-magnetic sheath, the magnet wire and non-magnetic sheath extending uninterrupted between a first free end and a second free end of the loop antenna; and
    a transceiver block mountable to the tool body, wherein each of the free ends of the loop antenna is secured to the transceiver block so that the loop antenna forms a loop that can at least partially encircle a tool body.

2. The antenna assembly of claim 1, wherein the loop antenna comprises a plurality of single, solid, conductive strands of magnet wire individually encased in the sheath.

3. The antenna assembly of claim 1, further comprising a metal adaptor attached to each free end of the loop antenna, each metal adaptor securing a free end of the loop antenna to the transceiver block with an elastomer sheath overmolding a portion of the metal adaptor and a portion of the loop antenna.

4. The antenna assembly of claim 1, further comprising:
    a shield extending adjacent the loop antenna around the tool body; and
    a non-conducting locating ring positioned between the shield and the tool body, the locating ring securing the loop antenna about the tool body.

5. A downhole resistivity logging tool comprising:
    a downhole tool body having a longitudinal axis;
    a loop antenna comprising a conductor encased in a flexible, non-magnetic sheath, the conductor and sheath extending between a first free end and a second free end of the loop antenna; and
    a transceiver block mounted on the tool body, wherein each of the first and second free ends of the loop antenna is secured to the transceiver block so that the loop antenna at least partially encircles the tool body.

6. The tool of claim 5, wherein the conductor is a magnet wire comprised of a single, solid conductive strand of wire coated with a coating selected from a group consisting of a thin insulation, a thin enamel insulation, and a polymer film.

7. The tool of claim 5, wherein a plane of the loop antenna is at an obtuse angle relative to the longitudinal axis.

8. The tool of claim 5, further comprising a metal adaptor attached to each free end of the loop antenna and securing the loop antenna to the transceiver block.

9. The tool of claim 8, further comprising an overmolding disposed over a portion of the metal adaptor and a portion of the loop antenna.

10. The tool of claim 5, wherein the loop antenna comprises a plurality of separate conductors encased in the sheath.

11. The tool of claim 10, wherein each conductor has a first and second free end and a plurality of free ends of the conductors are joined to one another to form a helical conductor path encased in the sheath.

12. The tool of claim 10, wherein the sheath has a substantially circular cross-section.

13. The tool of claim 12, wherein the plurality of strands are disposed symmetrically about an axis of the sheath.

14. The tool of claim 10, wherein the sheath is formed along a plane so as to have a flattened cross-section and each of the plurality of strands is disposed in substantially the same plane of the sheath.

15. The tool of claim 5, wherein the loop antenna is flexible between the first and second free ends.

16. The tool of claim 5, wherein the loop antenna comprises a plurality of strands of magnet wire encased in the sheath with each of the strands of magnet wire having a first free end and a second free end, and the first free end of one strand of magnet wire is electrically connected to the second free end of another strand of magnet wire at the transceiver block to form a helical conductor path encased in the sheath.

17. The tool of claim 5, further comprising:
a metallic shield extending adjacent the loop antenna around the tool body; and
a non-magnetic locating ring positioned between the shield and the tool body, the locating ring securing the loop antenna about the tool body.

18. A downhole resistivity logging tool comprising:
a downhole tool body having a longitudinal axis;
a loop antenna comprising a conductor encased in a flexible, non-magnetic sheath, the conductor and sheath extending uninterrupted between a first free end and a second free end of loop antenna;
a transceiver block mounted on the tool body, wherein each of the free ends of the loop antenna is secured to the transceiver block so that the loop antenna at least partially encircles the tool body;
a shield extending adjacent the loop antenna around the tool body; and
a non-conducting locating ring positioned between the shield and the tool body, the locating ring securing the loop antenna about the tool body.

19. The tool of claim 18, wherein the loop antenna comprises a plurality of conductors, each conductor a single, solid, strand of magnet wire individually encased in the sheath.

20. The tool of claim 19, further comprising a metal adaptor attached to each free end of the loop antenna, each metal adaptor securing a free end of the loop antenna to the transceiver block with overmolding deployed over a portion of the metal adaptor and a portion of the loop antenna.

* * * * *